Patented Sept. 1, 1953

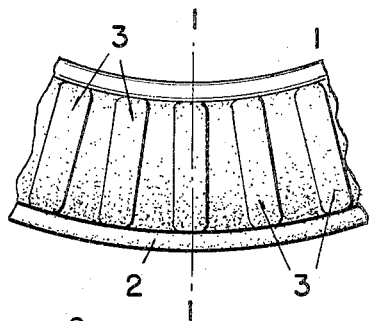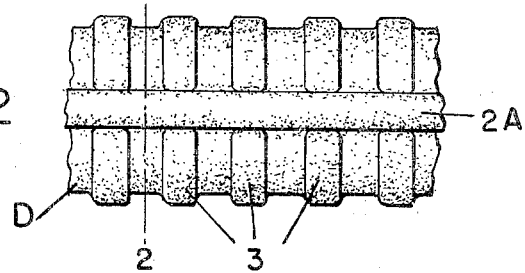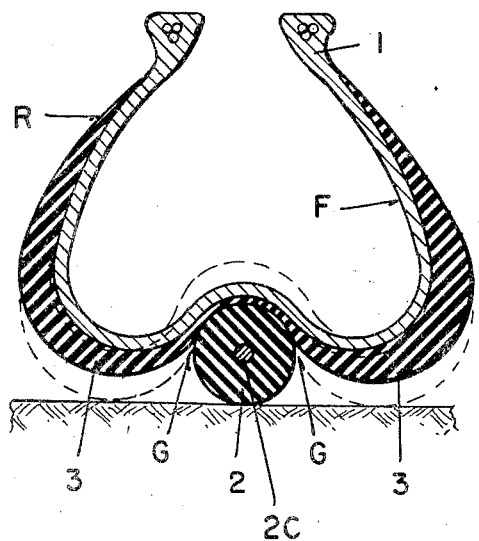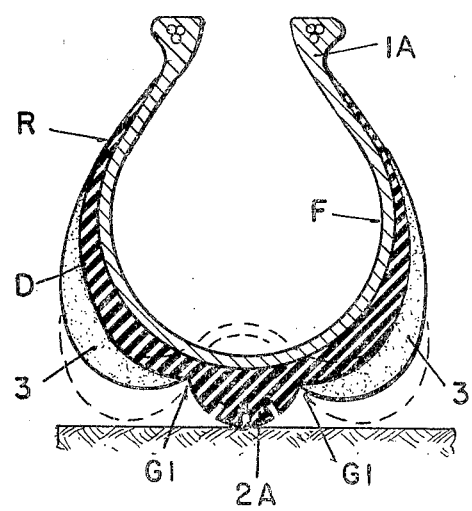

2,650,632

UNITED STATES PATENT OFFICE 2,650,632

ADJUSTABLE TIRE

Jesse D. Langdon, Long Beach, Calif.

Application May 5, 1949, Serial No. 91,590

5 Claims. (Cl. 152—176)

1

The invention pertains to pneumatic tires and the like, particularly of the non-skid kind.

The primary purpose of the invention is to provide a pneumatic tire which can be inflated to one pressure for ordinary use and partly deflated with the object in view of changing the nature of the tire tread surface against a road bed.

Another purpose of the invention is to provide a removable tread with the object in view of providing an easily replaceable central tread strip, which can be substituted for various types of treads to serve different purposes.

A further purpose is to provide a tire which will eliminate the necessity for removing and replacing non-skid chains and the like.

Other and further objects and purposes of the invention will appear as the specification goes forward, illustrated by the drawings, showing two ways of reduction to practice which may be changed within the scope of the claims.

In the drawings:

Fig. 1 is a side elevation of a fragment of the tire.

Fig. 2 is a fragmentary view of the tire looking at the forward face thereof.

Fig. 3 is a transverse cross section of one form of reduction to practice taken at 1—1 of Fig. 1, showing the tire made in two parts.

Fig. 4 is a cross section taken at 2—2 of Fig. 2, showing the tire made of a single piece.

The invention comprises a pneumatic tire carcass, having a central ridge portion forming chief tread means 2, Fig. 3, or 2A, Fig. 4, for contacting a road surface when the tire is inflated under one state of pressure, other tread means paralleling said chief tread means 2 and having transversely disposed cleats forming corrugated surface 3 for making additional tread contact with a road surface under another lower state of inflated pressure.

The component elements of the tire illustrated by the drawings are:

Carcass or casing 1 or 1A
Channel depression D
Auxiliary tire or chief tread 2 or ridge 2A
Corrugations 3—3
Fabric F
Rubber R
Grooves or clearance spaces G—G, G1—G1
Reinforcement cable 2C The reduction to practice shown consists broadly of two structural forms: 1. Fig. 3 shows a tire carcass or casing 1 where fabric F of the casing is normally configurated with depression

2

D bordered by groove means G—G circumscribing the tread center; a separate removable second tire or auxiliary tire 2 being disposed in depression D constitutes the chief tread normally contacting the surface when the tire is fully inflated. The corrugated surfaces 3—3 preferably made of resilient distortable material, located either side of auxiliary tire 2 are normally held away from a road bed by the central projecting ridge formed by auxiliary tire 2 bordered on either side by groove G—G. When the tire is partially deflated, the auxiliary tire 2 is urged and depressed between the groove means G—G either side of tire 2 which are at least partially closed due to the effect of the load carried on auxiliary tire 2 or at the point of contact with a road bed and to an extent permitting the roughly corrugated portions 3—3 of casing 1 to contact the road surface in addition to the auxiliary tire 2, according to the degree to which the tire is deflated.

The auxiliary tire 2 is provided with a cable 2C running thru and around the circumference thereof holding the same to circular form and fixed size.

Using the form as of Fig. 3: If desired, alternate rubber and metal sections may be used to form auxiliary tire 2 or a continuous chain may be substituted for auxiliary tire 2. Use of a chain substituted for auxiliary tire 2 involves deflation of casing 1 to permit placing the chain in groove means G—G. The state of inflation will govern the nature of the contacting surface of the tire against the road bed. A state of inflation low enough will permit either auxiliary tire 2, or a chain, if substituted for auxiliary tire 2 to recede into depression D, the bordering portion 3—3 will then contact the road bed simultaneously with auxiliary tire 2. Under a higher, normal, full state of inflated pressure, the auxiliary tire 2 or a chain substituted therefor will become the chief tread contacting the road bed, permitting the chain or auxiliary tire 2 to bite more deeply into a smooth icy surface thereby increasing the safety factor.

Forward faces of either tire 1 or tire 1A bordering either side of the auxiliary tire 2 or ridge 2A, respectively, form corrugated shoulders 3—3 which may be ridged or roughened in any suitable manner.

Fig. 3 involves a form of construction wherein fabric F of the casing 1 of the tire is configurated to conform with the inside of the separate auxiliary tire 2. The depression D is flared away from auxiliary tire 2 and borders the outside of grooves G—G of circumscribing casing 1. In this instance the fabric is shaped by the molding process to conform with the configuration of depression D, adapted to receive auxiliary tire 2 or a chain.

The species form of construction as of Fig. 4 includes the same principal features as Fig. 3. The narrow ridge 2A being substituted for the auxiliary tire 2 is molded on an integral part of the casing with the air cavity being of conventional shape.

When the tire illustrated by Fig. 4 contacts the road bed under a load, the ridge means 2A normally carries the load. When the tire is deflated, grooves G1—G1 permit the corrugated shoulders 3—3 to move radially outward and forward to contact the road surface. The outer boundary of the outer edge of each shoulder is converged inwardly toward the ridge 2A permitting the shoulders to contact the road bed substantially as shown by the dotted lines thus increasing the frictional surface contacting the road bed.

The invention has the following new, novel and unique safety features:

The reduction to practice illustrated by both Figs. 1 and 2 provides means for changing the nature of the forward face of casing 1 for contacting a road bed under various weather conditions by changing the state of tire inflation to adjust the contour of the casing tread to meet varied conditions of the road bed and permit independent use of one tread to the exclusion of another.

Operation and use of the device as illustrated by Fig. 1 is as follows: In order to place auxiliary tire 2 in operative position in groove means G—G, casing 1 being completely deflated and preferably removed from the rim, the periphery of the tire is folded inwardly to shorten the circumference of casing 1 sufficiently to permit auxiliary tire 2 to be slipped over the outer circumference of casing 1. The casing is inflated to hold auxiliary tire 2, or a chain ring, if desired, securely in place. The state of inflation governs the extent to which the ridge and/or the balance of the forward face of casing 1 will be changed to have contact with the road bed when the tire is under load.

It will be noted that the chief tread, auxiliary tire 2 or ridge 2A of Figs. 3 and 4, respectively, of the two species reduced to practice as illustrated, extend radially outwardly in the plane of the median line of casing 1, each form of the chief tread being paralleled circumferentially by shoulders 3—3 which recede inwardly of the outmost confines of the shoulders 3—3. This form of construction is inherently essential to form a groove of ample extent to permit the chief tread to recede radially inwardly and the shoulders or secondary tread project forwardly to contact a road bed.

If desired, the auxiliary tire 2 may be in the form of a pneumatic tube which will serve to cushion the casing against injurious stress, if the latter is punctured.

Having described my invention and the use thereof, the following claims are made:

1. A pneumatic tire including a casing made of deformable material surrounding a cavity adapted to receive a pneumatic element of inflation, said casing having a chief tread and a secondary tread, said chief tread circumscribing said tire in the median plane and projecting radially outwardly a substantial distance beyond the circumferential surface of said secondary tread for contacting a road surface independently of said secondary tread, said secondary tread comprising shoulders paralleling and extending laterally of said chief tread and tapering radially thinner toward the median plane to form with said chief tread clearance spaces circumscribing the tire either side thereof and to permit said chief tread to circumferentially recede radially inwardly and said secondary tread to move radially outwardly on deflection of said tire.

2. A multiple treaded pneumatic tire made of deformable material comprising a chief tread and a secondary tread, said chief tread circumscribing said tire in the median plane and projecting radially outwardly a substantial distance beyond the circumferential surface of said secondary tread for contacting a road surface independently of the secondary tread, said secondary tread having ribs perpendicular to said chief tread, extending laterally therefrom and tapering radially thinner toward said median plane, a clearance space formed by a groove between said chief tread and said secondary tread to permit said chief tread to circumferentially recede radially inwardly and said secondary tread to contact said road surface upon deflation of said pneumatic tire.

3. A tire as defined by claim 1 wherein the casing includes fabric intermolded and configurated to conform with the contour of a channel formed by a median depression recessed circumferentially of said tire, the chief tread formed by a second tire embedded in said median depression.

4. A tire as defined by claim 1 wherein the casing includes fabric intermolded and configurated to conform with the contour of a channel formed by a median depression recessed circumferentially of said tire, the chief tread formed by a second tire embedded in said median depression; the second tire being in the form of a pneumatic tube.

5. A tire construction as defined by claim 2 wherein the pneumatic tire is integrated with fabric molded with a depression forming a median channel circumscribing the outer diameter of the cavity containing the pneumatic medium of inflation, the chief tread formed separately of a second tire resting in the channel.

JESSE D. LANGDON.

References Cited in the file of this patent

UNITED STATES PATENTS

| Number | Name | Date |
|---|---|---|
| 826,612 | Sawyer | July 24, 1906 |
| 922,631 | Reddaway | May 25, 1909 |
| 1,571,493 | Schumacher | Feb. 2, 1926 |
| 2,403,309 | Smith | July 2, 1946 |

FOREIGN PATENTS

| Number | Country | Date |
|---|---|---|
| 8,320 | Great Britain | 1908 |